United States Patent [19]

Deits et al.

[11] Patent Number: 5,290,070
[45] Date of Patent: Mar. 1, 1994

[54] CARRIAGE GUIDES FOR HEAD DISK ACTUATOR ASSEMBLIES

[75] Inventors: Scott H. Deits, Littleton; Gary T. Krech, Thornton; Robert D. Turner, Denver; Ronald B. Warner, Englewood, all of Colo.

[73] Assignee: Storage Technology Corporation, Louisville, Colo.

[21] Appl. No.: 820,275

[22] Filed: Jan. 14, 1992

[51] Int. Cl.⁵ .................. F16C 33/02; F16C 33/62
[52] U.S. Cl. .................... 384/625; 384/55; 384/492
[58] Field of Search ........... 384/625, 449, 492, 569, 384/58, 55; 148/212; 204/129.35, 129.65

[56] References Cited

U.S. PATENT DOCUMENTS

| | | | |
|---|---|---|---|
| 4,290,867 | 9/1981 | Jumer | 204/129.35 |
| 4,545,117 | 10/1985 | Okamoto | 384/50 X |
| 4,719,074 | 1/1988 | Tsuno et al. | 148/212 X |
| 4,916,981 | 4/1990 | Suzuki et al. | 384/625 X |

*Primary Examiner*—Thomas R. Hannon
*Attorney, Agent, or Firm*—Duft, Graziano & Forest

[57] ABSTRACT

The carriage guides for head disk actuator assemblies of the present invention include bearings and guide rails which reduce the problems associated with the wear between the bearings and rails. The bearings and guide rails of the present invention have nitrided outer contact surfaces with improved wear characteristics while the inner surfaces are not affected. Further, the bearings have radiused outer edges to reduce the point contact caused by misalignment between the bearings and the rails. The apparatus of the present invention is manufactured using an electro-polishing process to remove the amounts of embedded non-metallic surface contaminants present on the outside surface of the bearings. The present invention also provides guide rails having plasma coated ceramic layers to eliminate metal to metal contact with the bearings, to reduce the susceptibility to contact fatigue damage, to reduce the coefficient of friction between the rails and bearings, to match the thermal properties of the baseplate assembly and to eliminate flexible mounting of the center rails.

12 Claims, 2 Drawing Sheets 5,290,070

CARRIAGE GUIDES FOR HEAD DISK ACTUATOR ASSEMBLIES

BACKGROUND OF THE INVENTION

Field of the Invention

This invention relates to the field of carriage guides for head disk actuator assemblies, particularly to improved wear characteristics for carriage guide rails and bearings.

PROBLEM

A critical factor affecting the performance, reliability and life of head disk actuator (HDA) assemblies is the operating cleanliness of the HDAs. This is becoming even more critical due to the increased recording density in magnetic disk drives. Dust or particle contaminants in HDAs can damage the HDA as well as cause faults on the disks.

Typically, in magnetic disk drives, linear guide actuators are utilized due to higher performance characteristics. These actuators are normally guided by carriage bearings mounted on the actuators. The outer surfaces of the carriage bearings contact a combination of cylindrical and flat metallic guide rails to guide and support the actuators. Wear on the surfaces of the bearings and rails occurs due to rolling fatigue, slippage and the metal-to-metal contact between the surfaces of the bearings and the guide rails.

This contact fatigue can cause large particles to break loose from the guide rails or the bearings. These large particles become "ballistic" within the head disk actuator assembly, causing defects on the disks leading to data loss. Abrasive wear between the surfaces of the bearings and guide rails can create minute metal particles which build up over a long period of time in the HDA to damage the HDA assembly and cause data loss. Adhesive wear is caused by fine scale welding during rolling contact between the surfaces of the bearings and guide rails. This fine scale welding breaks loose from the surface on which it is formed and builds up in the HDA over a long period of time to cause damage.

Another problem occurs due to the bearings in the HDA assembly not being properly aligned during initial installation or becoming misaligned during use. This misalignment causes the actuator to roll on the edges of the bearings rather than the flat contact surface of the bearings. This creates a point contact between the bearings and the guide rails rather than a line contact, which increases the stresses and wear on the contact surfaces.

Typically, the interior races and interior bushings of the carriage bearings are precisely formed and hardened, since in most applications these are the critical wear areas. Normally, the exterior of the bearing is pressed into a component with no rolling contact occurring between the outer surface of the bearing and other surfaces. Also, wear debris generated internally in the bearing is contained by grease on the side shields of the bearing. However, in the present application, the outer surface of the bearings undergoes rolling contact with the guide rails and the interior races and bushings of the bearings have lower stress than normal on them. Thus, the interior components of the bearings normally outlast the life of the HDA assembly. However, since the exterior surfaces of the bearings have become worn, these bearings are not reused.

Prior art attempts to solve these problems have been largely unsuccessful. The use of lubricants to reduce the metal-to-metal contact introduces another source of contaminants into the HDA assembly. The lubricants tend to relocate on the surfaces to which they are applied causing nonuniform lubrication and stress. Also, the HDA assemblies are not accessible to lubricate the carriage surfaces as needed. Ceramic coated guide rails have also been used in order to reduce the metal-to-metal contact, but the results have been inadequate. The wear rates on the prior art ceramic coated guide rails have been high, introducing even more contaminants into the disk drive. Also, these coatings have been unevenly applied or else have been applied at great cost. One prior art approach used a ceramic sleeve over the guide rails but this approach was quite expensive.

Therefore, a need exists for an actuator carriage guide assembly that is not susceptible to wear contamination or misalignment and that does not significantly increase the cost of the HDA assembly.

SOLUTION

The apparatus of the present invention provides improved bearings and guide rails for head disk actuator assemblies which reduce the problems associated with the wear between the bearings and guide rails. The bearings of the present invention have outer contact surfaces with improved wear characteristics while the inner surfaces are not affected. These outer contact surfaces have undergone an ion-nitriding process at a reduced temperature for a controlled period of time. This process provides an outer contact surface having a hardness of about 900 Vickers to a depth of about one and one-half thousandths of an inch. This treatment reduces the abrasive wear on the outer contact surface of the bearings while not affecting the machinability or wearability of the inner surfaces of the bearings.

Further, the bearings have increased radius outer edges to reduce the line contact caused by misalignment between the bearings and the guide rails. The radius of the outer edges is selected to be much greater than the radius of prior art bearings so that the stress between the bearing and the guide rail is spread over a larger contact area than in earlier bearings. An electro-polishing process is also used in the manufacture of the bearings to remove embedded non-metallic surface contaminants present on the outer contact surfaces of the bearings. This electro-polishing technique reduces the problems encountered when abrasive finishing techniques are used in the bearing manufacturing process.

The present invention also provides guide rails having plasma coated ceramic layers to eliminate metal to metal contact between the bearings and guide rails, to reduce the susceptibility to contact fatigue damage, to reduce the coefficient of friction between the guide rails and bearings, to more closely match the thermal properties of the HDA baseplate assembly and to eliminate the need for flexible mounting of the center guide rails.

These features, alone and in combination, provide a head disk actuator assembly with improved wear characteristics to increase the performance, reliability and life of the head disk actuator assembly.

DETAILED DESCRIPTION

The present invention provides a carriage guide for a head disk actuator assembly having improved wear characteristics. One factor which greatly affects the operation and life of head disk actuator assemblies is the wear and debris that arises from contact between the guide bearings and guide rails of the carriage guides. The present invention increases the operation and life of the head disk actuator assemblies by providing a carriage guide having guide rails and guide bearings which have improved wear characteristics.

Figure 1:
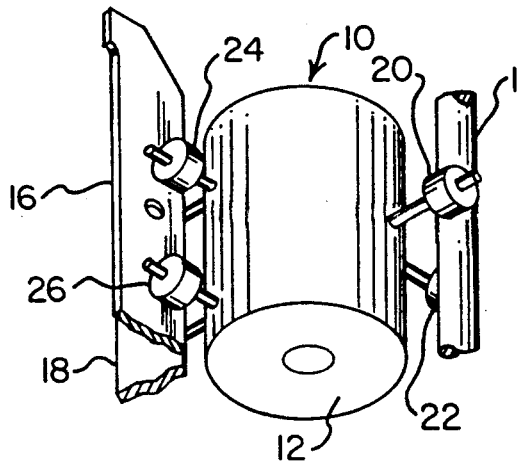
FIG. 1 illustrates a linear guide actuator of a head disk actuator assembly which uses bearings of the the present invention.
Figure 3:
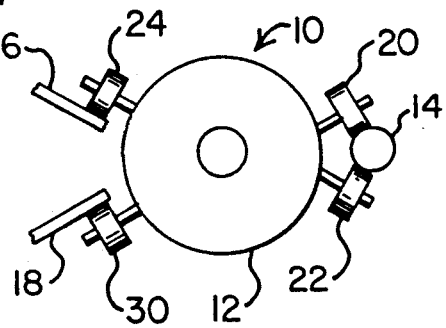
FIG. 3 shows an end view of the guide actuator of FIG. 1.
Figure 2:
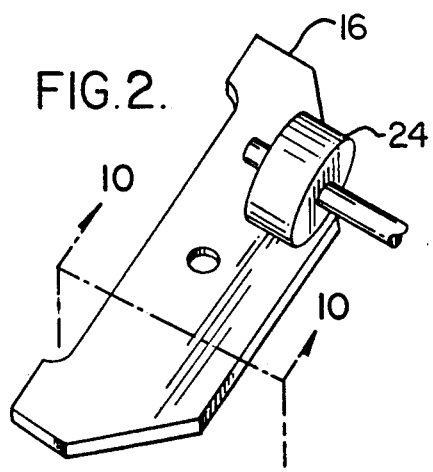
FIG. 2 shows a guide rail on which a guide bearing is mounted for rolling contact.

Guide assembly 10 for head disk actuator assembly 12 is illustrated in FIG. 1. Head disk actuator 12 normally positions a read/write recording head (not shown) relative to hard disks (not shown) in a hard disk drive. This read/write recording head positioning must be extremely precise, thus the performance and reliability of guide assembly 10 is critical. Guide assembly 10, in the descriptive embodiment, includes cylindrical center rail 14, fixed rail 16 and load rail 18. Miniature radial bearings 20, 22 are rotatably mounted on actuator 12 to rotatably traverse center rail 14. Likewise, miniature radial bearings 24, 26 are rotatably mounted on actuator 12 to rotatably traverse fixed rail 16 and miniature radial bearings 28 (not shown), 30 are rotatably mounted on actuator 12 to rotatably traverse load rail 18. Load rail 18 is resiliently biased by a loading mechanism (not shown) to ensure that all of the bearings maintain contact with the respective rails. Other possible head disk actuator assemblies include the use of a carriage supported by three symmetrically spaced round guide rails rather using a single round rail with two flat rails. The present invention is usable with the three round guide rails, however only the first described embodiment is discussed.

In the prior art guide assemblies for head disk actuator assemblies, the performance and reliability of the head disk actuator assemblies were affected by wear due to the metal to metal contact between bearings 20–30 and guide rails 14–18. The present invention provides bearings 20–30 and guide rails 14 wear between the bearings and guide rails. The bearings of the present invention, as discussed in greater detail below, have outer contact surfaces with improved wear characteristics while the inner surfaces are not affected. Further, the bearings of the present invention have outer edges with greater radius to reduce the stress concentration that results from misalignment between the bearings and the guide rails. The present invention also provides an electro-polishing process, discussed in greater detail below, to remove the amounts of embedded non-metallic surface contaminants present on the outer contact surface 32 of the bearings. The present invention also provides guide rails having plasma coated ceramic layers, discussed in greater detail below, to eliminate metal to metal contact with the bearings, to reduce the susceptibility to contact fatigue damage, to reduce the coefficient of friction between the guide rails and bearings, to better match the thermal properties of the baseplate assembly and to eliminate the need for flexible mounting of the center rail 14.

Guide Bearings

Figure 4:
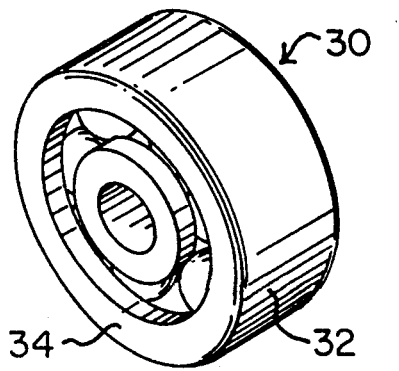
FIG. 4 shows a bearing of the present invention.
Figure 5:
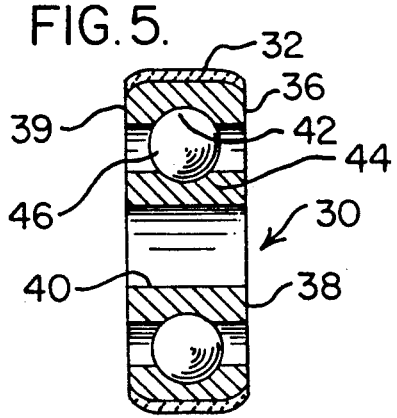
FIG. 5 shows a cross-section of the bearing of FIG. 4.

Guide bearings 20–30 are miniature radial ball bearings of similar design. Only bearing 30 is described in detail with the understanding that the remaining bearings 20–28 include identical characteristics. Bearing 30, shown in FIGS. 4 and 5, includes outer surface 32 which makes rolling contact with guide rail 18, side surfaces 34, 36, inner ring 38, inner bore 40, ball races 42, 44 and ball bearings 46. Guide bearing 30 is fabricated from Type 440C stainless steel or other similar well known bearing materials.

Outer surface 32 of guide bearing 30 is treated by carefully ion-nitriding at specific parameters. Traditionally, ion-nitriding has not been successfully applied to this type of bearing due to the degradation of the inner surfaces of the bearing, which deteriorates the durability of the bearing. In typical usage, such as with rotating shafts, the primary wear on these bearings occurs on the inner surfaces. However, in the present instance, the load characteristics on the bearings is due to the rolling contact on the outer surface 32 and the wear on the inner surfaces is minimal. The inner surfaces are lubricated, while the outer contact surface 32 is non-lubricated to reduce contamination. Also, the inner surfaces are machined after the ion-nitriding treatment. Since the ion-nitriding treatment affects all exposed surfaces, the increased surface hardness makes the machining of the exposed surfaces difficult. Traditional nitriding processes occur at temperature ranges above nine hundred fifty (950) degrees Fahrenheit. This treatment causes the exposed surfaces to become harder while the unexposed inner material becomes softer. Thus, once machined, unexposed inner raceway surfaces would not possess adequate hardness in order to be useful.

The bearings of the present invention makes use of a process for ion-nitriding only the outer surface 32 of bearing 30 which undergoes rolling contact with guide rail 18. The ion-nitriding process is carefully controlled to limit the effects of the process to a limited depth of outer surface 32 to prevent the undesirable affects on the side surfaces and the inner surfaces 34, 36 of the bearing. Only the outer contact surface 32 of the bearings of the present invention are treated. The inner surfaces and the side surfaces 34, 36 are masked to prevent these surfaces from being affected by the treatment. The outer contact surfaces 32 are then treated by vacuum ion-nitriding at a temperature about eight hundred twenty-five (825) degrees Fahrenheit for approximately 24 hours. This provides a hardened outer contact surface 32 to a depth of about one and a half (1.5) thousandths of an inch. The bearing hardening process can also be accomplished by vacuum ion-nitriding the bearing at temperatures up to approximately nine hundred (900) degrees Fahrenheit and for time periods up to thirty-two (32) hours. This process provides a hardened surface only on the outer contact surface 32 of the bearing to a depth of about 1.5 thousandths of an inch without affecting the hardness or wear characteristics of the inner or side surfaces of the bearing. In addition, nitrogen ion implantation could be used in lieu of vacuum ion-nitriding to alter the surface characteristics of the outer contact surface 32 without affecting the inner hardness or wear characteristics. Typically, outer contact surface 32, after the above described treatment has a hardness of about 900 Vickers. An additional result is that there are minimal dimensional changes in the ion-nitrided bearing. This is critical in order to accommodate the bearing ring fabrication process.

By providing a hardened outer surface 32 to a limited depth, the particulate contamination due to abrasive wear is reduced without significantly affecting the durability or machinability of the inner and side surfaces 34, 36 of bearing 32. The inner races 42, 44 are not affected or only minimally affected by this process of ion-nitriding, and can still be machined after the ion-nitriding process. These machined surfaces are still at substantially their original hardness and strength levels to maintain the durability of the bearing.

Electro-polishing

The bearings, either after treating and machining, or even after use, often are contaminated with non-metallic particles which can greatly affect the wear and durability performance characteristics of the drive. The present invention makes use of an electro-polishing process for cleaning the outer contact surfaces 32 of the bearings without affecting the interior surfaces of the bearings.

Figure 6:
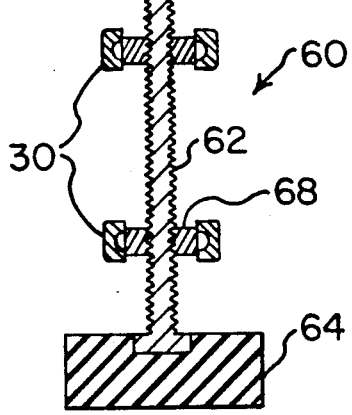
FIG. 6 shows a cross-section of the electro-polishing fixture used to manufacture the bearings of the present invention.
Figure 7:
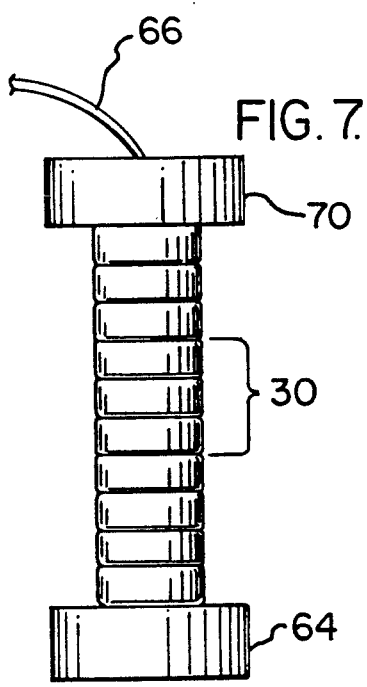
FIG. 7 shows the fixture of FIG. 6 fully loaded.

Fixture 60, shown in FIG. 6, is provided for fixturing the bearings during the electro-polishing process. Fixture 60 includes threaded rod 62 having insulating boot 64 at one end and connected to electrical conducting wires 66 at the other end. Bushings 68 having threaded inner surfaces mate with threaded rod 62. The outer surfaces of bushings 68 are sized to snugly fit within the inner diameter of the outer ring of bearing 30. Insulating boot 70 fits over the upper end of fixture rod 62. In use, bushings 68 are inserted within inner bore of the outer ring of bearing 30. Bearing outer rings and bushings 68 are then threaded onto fixture rod 62. Bushings 68 are tightened so that the outer ring of bearings 30, as shown in FIG. 7, closely abut one another to form a seal between the bearings 30. Once all of the outer rings of bearings 30 are loaded onto fixture rod 62, insulating boot 70 is placed over fixture rod 62 to seal the upper end of the last bearing outer ring. The loaded fixture rod is then placed into a solution of a standard electrolytic solution, such as a sulfuric-phosphoric acid solution. An electric current is applied to fixture rod 62 creating an anodic-cathodic cell. The non-metallic contaminants are electrochemically liberated from the outer surface 32 of the outer rings of bearings 30. The magnitude of the current and length of processing time are carefully controlled so the bearing surfaces are cleaned without harm to the actual bearings.

The electro-polishing process removes non-metallic particles which may have become embedded within the contact surfaces 32 of the bearings 30. The embedded particles are removed via controlled dissolution of the surrounding base material. This process is useful not only for new bearings, but has application in refurbishing used bearings. For instance, bearings in other applications may be refurbished by this process.

Radiused Bearings

Figure 8:
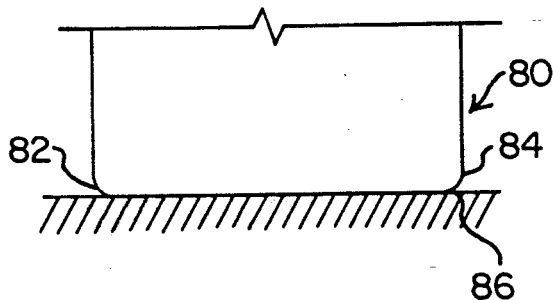
FIG. 8 shows a lower section of a prior art bearing.

The prior art guide bearings 80, shown in FIG. 8, include slightly radiused outer corners 82, 84. Typically, corners 82, 84 of the prior art bearings have a radius of less than 0.002 inches. If the guide assembly 10 is misaligned, the rolling contact between guide bearing 80 and guide rail 86 becomes a point contact which increases the wear and stress between bearing 80 and guide rail 86.

Figure 9:
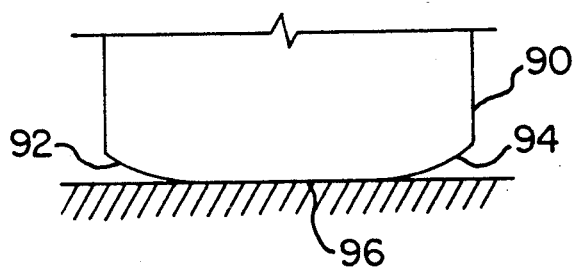
FIG. 9 shows a lower section of the bearing of the present invention.

The present invention provides bearing 90, shown in FIG. 9, which reduces the contact stress between bearing 90 and guide rail 96 during misalignment. Bearing 90 includes outer corners 92, 94 which include much greater radiuses, in the range up to 125 times larger, than the prior art bearings. This greater radius, 0.250 inch in the preferred embodiment, provides greater contact area between bearing 90 and guide rail 96 during misalignment between bearing 90 and guide rail 96. This greater rolling contact area spreads the stresses to reduce contact stress to manageable levels when misalignment occurs. The reduction in contact stress correspondingly reduces fatigue damage due to alternating contact stress.

The larger radius on bearings 30 can be formed by well known techniques, such as machining, grinding, etc. In the preferred embodiment, the radius on the bearings are formed by tumbling the bearings with an abrasive media to form the radius. A further benefit of the tumbling process is the elimination of the need for final honing of the outer surfaces of the bearings.

Guide Rails

Figure 11:
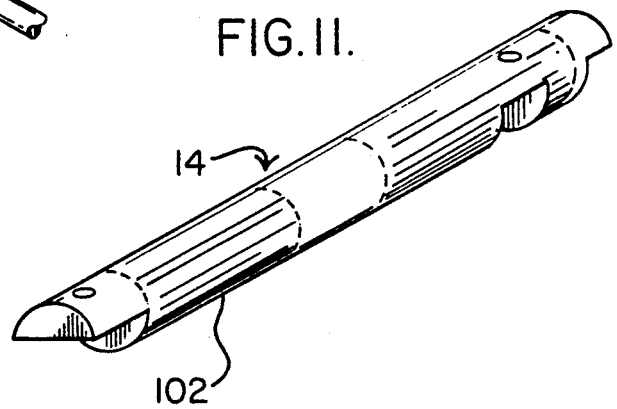
FIG. 11 shows a perspective view of the center guide rail of the present invention.
Figure 10:
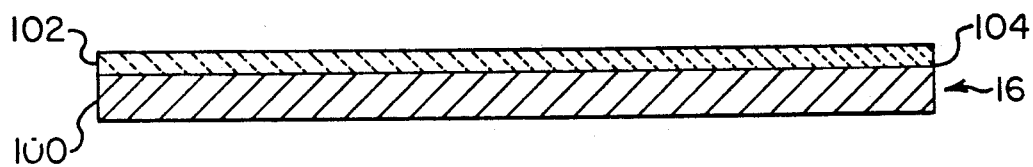
FIG. 10 shows a cross section of the guide rail of the present invention.

Guide rails 14 and 16, shown in FIGS. 10 and 11, are formed from an aluminum, zinc or magnesium alloy 100 with a composite ceramic coating 102. In the preferred embodiment, the composite ceramic coating is chromium oxide and titanium dioxide 102 applied to the aluminum substrate of guide rails 14, 16, with a nickel aluminide damping material on the aluminum-ceramic interface 104. This coating is applied by a tightly controlled plasma process. The plasma process is less expensive than vapor sputter or various oxygen fuel deposition processes and has the ability to build thicker layers. This particular composite ceramic coating has a number of benefits. The metal-to-metal contact between the guide bearings 20-30 and guide rails 14-18 is eliminated, thus reducing wear and debris from the rolling and sliding contact between the two metal surfaces. A second benefit is that this coating lowers the coefficient of friction between the guide bearings 20-30 and guide rails 14-18 but still provides a sufficiently high enough coefficient of friction to insure a relatively low depth of the surface stresses, thus providing resistance to delamination. The coefficient of friction, although lower than metal to metal contact, is still sufficient to prevent sliding contact between the guide rails 14-18 and the guide bearings 20-30, which would lead to abrasive wear of both guide rails 14-18 and bearings 20-30. A third benefit is this particular combination of substrate and coating has thermal expansion properties more closely matched with the cast aluminum baseplate to reduce the occurrence of an offtrack condition caused by differing rates of thermal expansion between the guide rails 14-18 and the baseplate. A side benefit is that the flexible center rail mountings presently used in the head disk actuator assembly to accommodate the differing rates of thermal expansion may be eliminated.

The preferred embodiment of chromium oxide-titanium dioxide provides a high surface hardness to reduce surface wear to reduce susceptibility to contact fatigue. Ceramic coatings on metal are less brittle than solid ceramics. The ceramic coatings on metal are also less prone to chipping and fracture. In the preferred embodiment, the chromium oxide-titanium dioxide ceramic coating is applied through plasma coating by injecting the ceramic powder into a torch flame onto the surface of the guide rails 14–18. The heat from the torch flame bonds the powder together onto the metallic surface of the guide rails 14–18. The preferred embodiment uses this technique to apply the ceramic coating, but it is to be expressly understood that other techniques of applying ceramic coatings as well as other types of ceramic coatings are considered to be within the scope of the claimed inventive concept.

The guide rails 14–18 may also be ion-nitrided with the same process described earlier. In the past, the guide rails are nitrided at high temperatures (i.e. above 1000 degrees Fahrenheit). This high temperature caused significant dimensional changes which required extensive machining of the guide rails to correct. The present process requires the guide rails to undergo ion-nitriding at temperatures between 825 and 900 Fahrenheit for a time period between 24 and 32 hours. This provides a guide rail having higher hardness and strength with significantly increased resistance to wear and fatigue. Guide rails which have been ion-nitrided by this process experience minimal size change so no additional machining is required. This process can also be used to restore used guide rails to usable condition.

The present invention provides a carriage guide assembly for head disk actuator assemblies in hard disk drives which have greatly reduced particle contaminants from wear between the carriage bearings and guide rails. This reduction of particle contaminants is due to the improved carriage bearing design, the ion-nitriding surface treatment, the electro-polishing process and the ceramic coated guide rails, in combination with one another as well as each element individually.

We claim:

1. A head disk actuator assembly for a magnetic disk drive, said head disk actuator assembly comprising:
    at least one bearing for guiding and supporting an actuator of said magnetic disk drive;
    said at least one bearing including:
        an inner surface portion;
        two opposing side surface portions;
        an outer surface portion having, when in use, a rolling contact surface for engaging a guide rail to guide and support said actuator; and
        wherein said contact surface has a hardness significantly greater than said inner surface portion and said opposing side surface portions to provide improved wear characteristics of said contact surface while facilitating machining of said inner surface portion and said opposing side surface portions.

2. The head disk actuator assembly of claim 8 wherein said contact surface is created by:
    ion-nitriding only said contact surface to increase the surface hardness and strength of said contact surface without affecting the remaining areas of said bearing.

3. The head disk actuator assembly of claim 2 wherein said ion-nitriding includes:
    ion-nitriding said contact surface by sealing off all surfaces of said bearing except said contact surface; and
    vacuum ion-nitriding said contact surface at a temperature between approximately eight hundred twenty-five (825) degrees Fahrenheit and approximately nine hundred (900) degrees Fahrenheit.

4. The head disk actuator assembly of claim 2 wherein said ion-nitriding process includes:
    vacuum ion-nitriding said contact surfaces for a predetermined time period between about twenty-four (24) hours and about thirty-two (32) hours.

5. The head disk actuator assembly of claim 1 wherein said contact surface is treated to increase the surface hardness of said contact surface to a depth of about one and one-half thousandths of an inch.

6. The head disk actuator assembly of claim 7 wherein said bearing includes corner edge surfaces formed on said contact surface and said side surfaces, said corner edge surfaces having a radius about or greater than ten percent per cent of the width of said contact surface.

7. The head disk actuator assembly of claim 6 wherein said corner edge surfaces are formed by tumbling said bearing with abrasive media to form said radius.

8. The head disk actuator assembly of claim 1 wherein said contact surface is treated by electro-polishing said contact surface to reduce the amounts of imbedded non-metallic surface contaminants present on said contact surface.

9. The head disk actuator assembly of claim 1 wherein said guide rail has a ceramic coating.

10. The head disk actuator assembly of claim 9 wherein said ceramic coating comprises a mixture of chromium oxide and titanium dioxide.

11. A head disk actuator assembly for a magnetic disk drive, said head disk actuator assembly comprising:
    at least one bearing for guiding and supporting an actuator of said magnetic disk drive;
    said at least one bearing including:
        two opposing side surface portions.
        an outer surface portion having a rollable contact surface for engaging a guide rail to guide and support said actuator;
        wherein said contact surface has a hardness significantly greater than said inner surface portion and said opposing side surface portions to provide improved wear characteristics of said contact surface while facilitating machining of said inner surface portion and said opposing side surface portions; and
        wherein said bearing includes corner edge surfaces formed on said contact surface and said side surfaces, said corner edge surfaces having a radius about or greater than ten percent per cent of the width of said contact surface.

12. The head disk actuator assembly of claim 11 wherein said guide rail has a ceramic coating.

* * * * *